L. M. SCHOONMAKER.
SIGN.
APPLICATION FILED APR. 6, 1908.
908,613.
Patented Jan. 5, 1909.
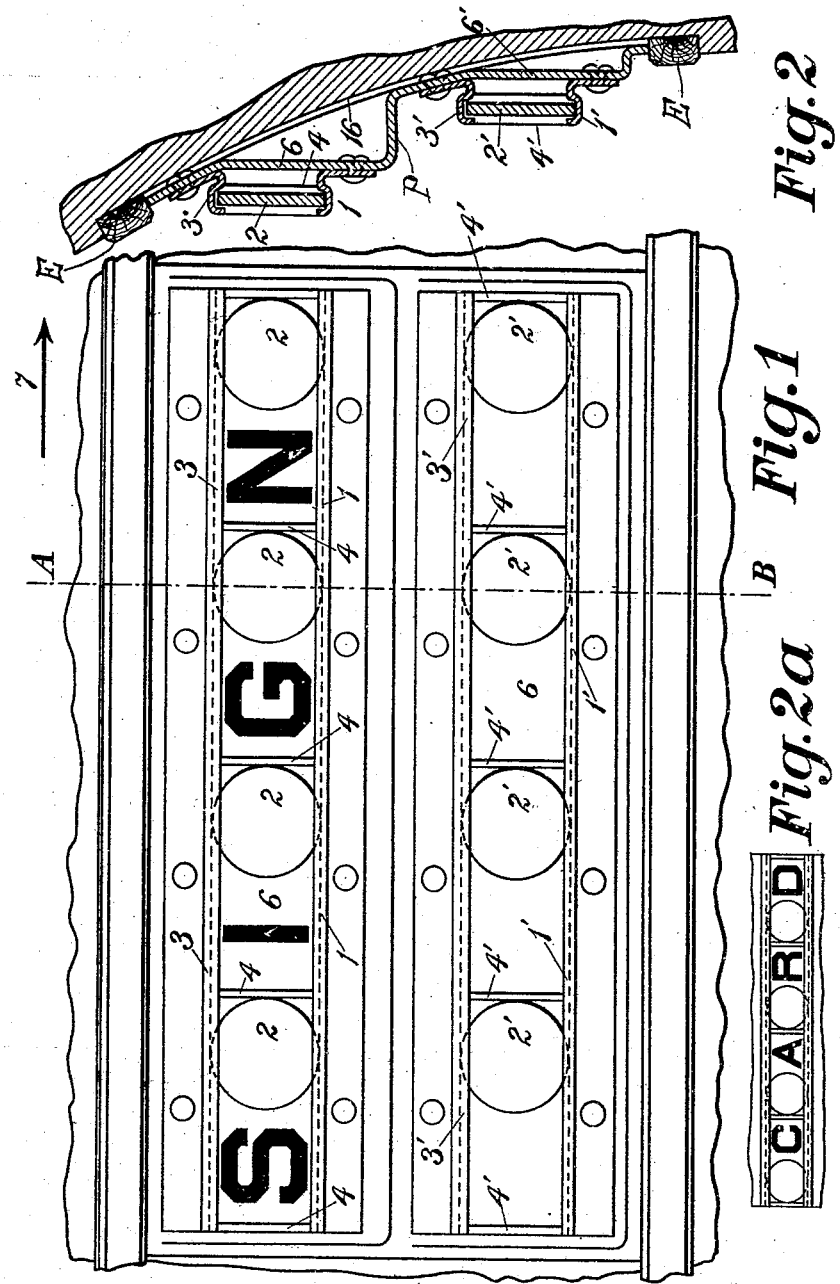
WITNESSES:
Fred W. Apgar
E. C. Thompson.
INVENTOR
LEON M. SCHOONMAKER
BY
Edward P. Thompson
ATTORNEY

UNITED STATES PATENT OFFICE.

LEON M. SCHOONMAKER, OF NEW YORK, N. Y.

SIGN.

No. 908,613.   Specification of Letters Patent.   Patented Jan. 5, 1909.

Application filed April 6, 1908. Serial No. 425,392.

*To all whom it may concern:*

Be it known that I, LEON M. SCHOONMAKER, a citizen of the United States of America, and resident of New York city, in the county of New York and State of New York, have invented certain new and useful Improvements in Signs, of which the following is a specification.

My invention relates to that class of device in which the force suddenly generated by the stopping or starting of cars or other vehicles, or any sudden variation of the motion, causes a weight to impart a motion to objects which alternately expose to view and conceal advertising matter.

The main object of the present invention is to so improve this class of device as to dispense with practically all mechanism for the sake of simplicity and economy of construction, but especially to provide motion advertisements which will be nearly as cheap as ordinary card advertisements.

Without regard to the various scopes of invention, which are attended to in the claims hereinafter annexed, my statement of invention is as follows:—

It comprises the combination with a vehicle, of a stationary card, having advertising matter in the form of words, pictures or ornamentation thereon, and one or more opaque wheels, arranged to travel back and forth in the direction of motion of the vehicle, and actuated by sudden variations of motion for alternately exhibiting and hiding parts or all of the visual objects, the aim being obviously to attract the attention of passengers much more effectively than would be accomplished by a continuously visible advertising matter.

The invention is represented in the accompanying drawings.

Figure 1 is a front elevation of a sign. Fig. 2 is a vertical cross-section, at about the line AB. In both figures a portion of the supporting vehicle is represented. Fig. 2$^a$ is a view of a portion of Fig. 1, on a reduced scale.

1 represents a track on which opaque wheels 2 are free to roll through limited distances, while 3 represents a guide above the track 1 for holding the wheels 2 upright. Stops 4 suitably limit the travel of the screens 2, with the result that each roller screen 2 may move through about double its own diameter. At the left of each opaque wheel 2 is a letter, all of them together spelling the word " Sign ", as indicated at the top of Fig. 1.

6 represents the upper portion of a card upon which the letters of the word " Sign " are printed, and which is located directly behind the opaque wheels 2.

The *modus operandi* is as follows;—When the car starts in the direction of the arrow 7, the opaque wheels 2, by the well known principles of inertia and momentum, roll to the left and hide the letters of the word " Sign." This action also takes place during any sudden variation of the forward motion of a car, while on the other hand, the opposite kind of variation will bring the letters of the word " Sign " into sudden view again. At the lower part of Figs. 1 and 2 are exactly similar elements marked with the same numerals primed, and arranged with respect to the lower portion 6' of the advertising card, on which are the letters forming the word " Card ". In Fig. 1, these letters are behind the opaque wheels 2', but in Fig. 2$^a$, these letters are exposed, as the opaque wheels 2' have rolled to the left, by the action of the motion of the car.

Any desirable words or pictures or ornamentation may be substituted for the words " Sign " and " Card," and the invention may be modified without limit so long as it falls under the wording of my claims.

The advertising spaces left on cars are usually curved as shown at 16. The cards 6 and 6' are joined into one piece, which is sprung in between the end abutments E of the curved space reserved for advertising cards. As shown in the drawing, the card 6 is vertical, and the card 6' is vertical, while they are joined into one piece by the cross piece P. Therefore, although the cars have these curved spaces, yet in my invention, the characters stand upright, and the opaque wheels 2 and 2', also are vertical.

I claim as my invention:—

1. The combination with a vehicle, of a stationary card, having advertising matter thereon, and opaque wheels actuated to and fro by the variable motions of said vehicle, for alternately exposing to view and concealing said advertising matter.

2. The combination with a moving vehicle, of a practically horizontal track, opaque wheels thereon, guides for said wheels, stops for limiting the travel of said wheels, a card board behind said wheels, and having characters thereon, said wheels being movable in front of and to one side of said characters by changes in the speed of the vehicle, whereby said characters are alternately exhibited and hidden.

3. The combination with a vehicle, of stationary characters, and opaque wheels actuated by the changes of motion of said vehicle, for alternately hiding and exhibiting said characters.

4. The combination with the curved portion 16 of a vehicle, of end abutments E, a card having vertical portions 6 and 6' and joining piece P, sprung in between the abutments E, said cards being provided with characters; and wheels, movable by the action of the vehicle, in front of and away from said characters, for alternately hiding and exposing said characters.

LEON M. SCHOONMAKER. [L. S.]

Witnesses:
FRED W. APGAR,
SEYMOUR TAFT.